(12) United States Patent
Moribayashi

(10) Patent No.: US 9,176,691 B2
(45) Date of Patent: Nov. 3, 2015

(54) OUTPUT CONTROL DEVICE AND OUTPUT CONTROL METHOD

(71) Applicant: Yuta Moribayashi, Kanagawa (JP)

(72) Inventor: Yuta Moribayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/291,437

(22) Filed: May 30, 2014

(65) Prior Publication Data

US 2014/0355026 A1    Dec. 4, 2014

(30) Foreign Application Priority Data

Jun. 4, 2013  (JP) ................................. 2013-118062
May 14, 2014  (JP) ................................. 2014-100858

(51) Int. Cl.
*G06F 3/12* (2006.01)
*G06K 15/00* (2006.01)

(52) U.S. Cl.
CPC ............ *G06F 3/1262* (2013.01); *G06F 3/1267* (2013.01); *G06F 3/1276* (2013.01)

(58) Field of Classification Search
None
See application file for complete search history.

(56) References Cited

U.S. PATENT DOCUMENTS

| | | | |
|---|---|---|---|
| 6,616,359 B1* | 9/2003 | Nakagiri et al. | 400/582 |
| 7,161,691 B2* | 1/2007 | Nakagiri et al. | 358/1.13 |
| 2003/0011802 A1* | 1/2003 | Nakagiri et al. | 358/1.13 |
| 2010/0328721 A1* | 12/2010 | Ohira | 358/1.15 |
| 2012/0170066 A1 | 7/2012 | Moribayashi | |
| 2014/0355059 A1* | 12/2014 | Asai | 358/1.15 |

FOREIGN PATENT DOCUMENTS

JP  2012-113591  6/2012
JP  2014-038434  2/2014

* cited by examiner

*Primary Examiner* — Marcus T Riley
(74) *Attorney, Agent, or Firm* — IPUSA, PLLC

(57) ABSTRACT

An output control device includes an output instruction unit configured to give an instruction for outputting a single output information item, to an application requesting output of the single output information item as plural output information items having the same identification information based on an output instruction, and to subsequently give an instruction to output end information indicating an end of the single output information item; a storage control unit configured to store the output information items output from the application in a save area upon changing the identification information of the output information items into different identification information items; a determination unit configured to determine whether the instruction to output the end information has been given; and a combining unit configured to combine the output information items stored in the save area, when the determination unit determines that the instruction to output the end information has been given.

10 Claims, 12 Drawing Sheets

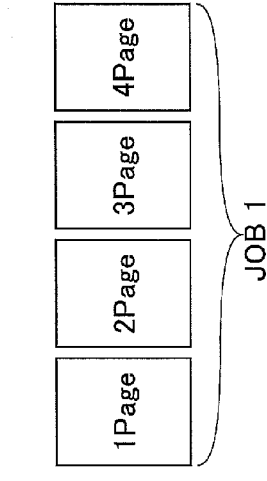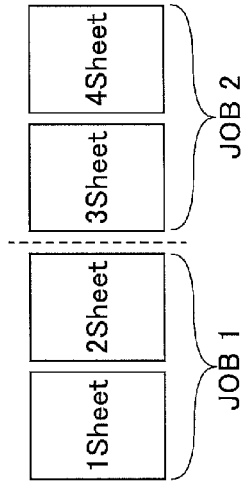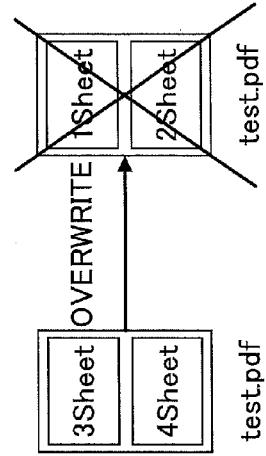
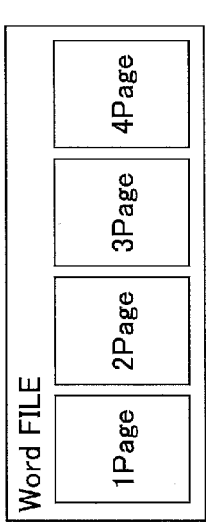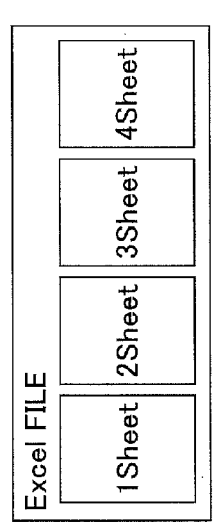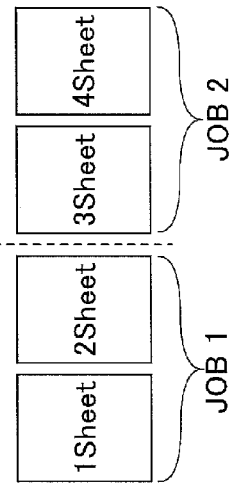
FIG.1A  FIG.1B  FIG.1C

FIG.6
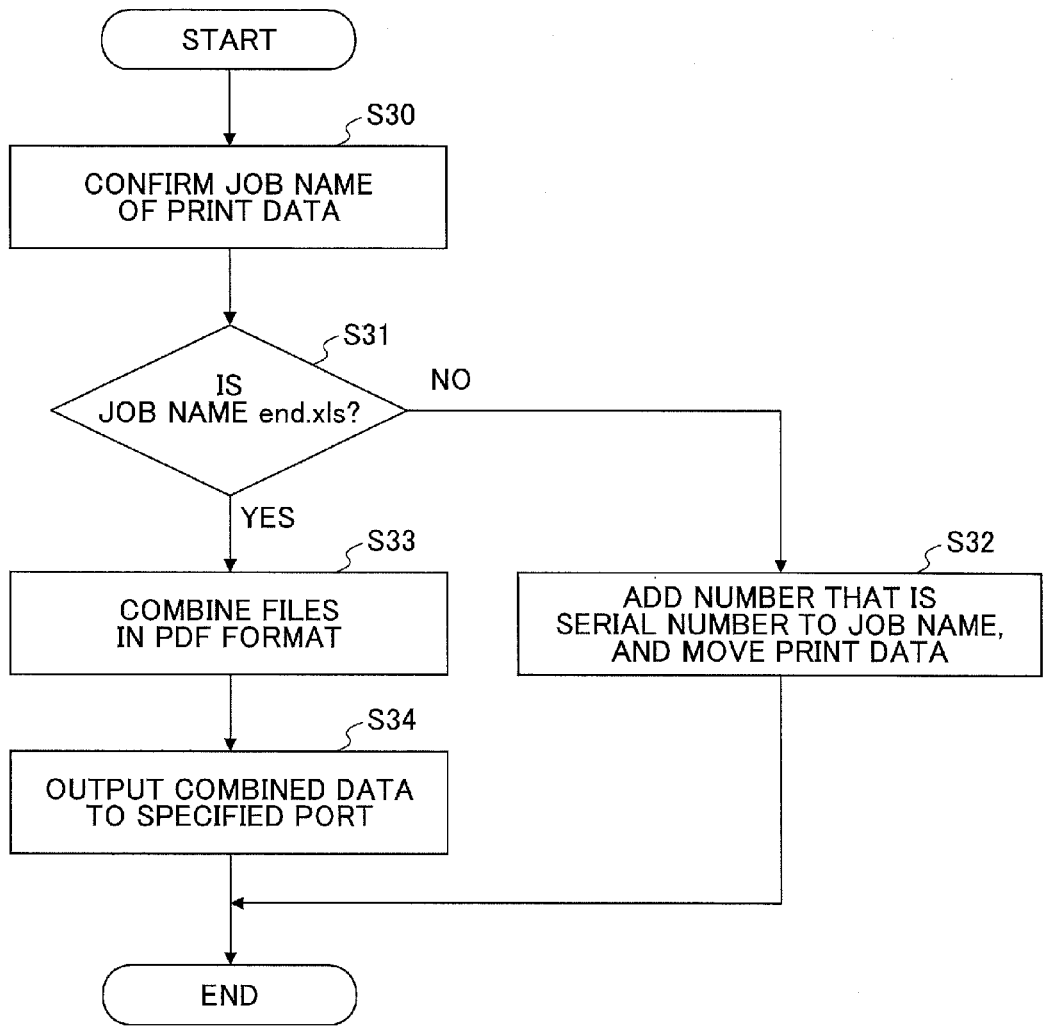
FIG.7A   FIG.7B
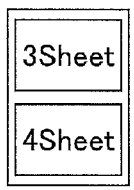
FIRST
PAGE
test.pdf
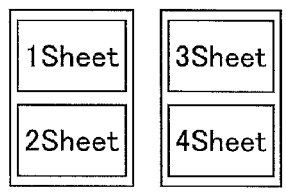
FIRST   SECOND
PAGE    PAGE
test.pdf

OUTPUT CONTROL DEVICE AND OUTPUT CONTROL METHOD

BACKGROUND OF THE INVENTION

1. Field of the Invention

The present invention relates to an output control device and an output control method.

2. Description of the Related Art

There is known a system for switching an application for each file type with respect to files created with document editing software and spreadsheet software, and printing and computerizing the file. In this system, an application is activated, and an instruction such as "print with printer" or "computerize by PDF (Portable Document Format) file" is given, to output each file in the instructed format.

For example, when printing a file (data), print data is created from the target file with a predetermined printer driver, and the created print data is sent to a printer via a TCP/IP port monitor. Furthermore, when computerizing a file, the computerized data created with a computerizing driver such as a PDF driver is output to a folder, etc., via a local port monitor.

Note that conventionally, there is known a system for combining a print job with another print job (output request) to create a single job, and printing the job (see, for example, Patent Document 1).

However, by the conventional method as described in Patent Document 1, when computerizing a single job (output request) in a predetermined format, there are cases where a single job is determined as including a plurality of jobs by the application. In this case, when the jobs are saved in a folder via a local port monitor, the jobs are sequentially overwritten, and consequently only the file (output information) of the final job is computerized. Therefore, even when a user opens a computerized file, only the final job is displayed, and the entire single job expected by the user cannot be confirmed.

Patent Document 1: Japanese Laid-Open Patent Publication No. 2012-113591

SUMMARY OF THE INVENTION

The present invention provides an output control device and an output control method, in which one or more of the above-described disadvantages are eliminated.

According to an aspect of the present invention, there is provided an output control device including an output instruction unit configured to give an instruction for outputting a single output target information item, to an application requesting output of the single output target information item as a plurality of output information items having the same identification information based on an output instruction, and to subsequently give an instruction to output end information indicating an end of the single output target information item; a storage control unit configured to store the plurality of output information items output from the application in a predetermined save area upon changing the identification information of the plurality of output information items into identification information items that are different from each other; a determination unit configured to determine whether the instruction to output the end information has been given by the output instruction unit; and a combining unit configured to combine the plurality of output information items stored in the predetermined save area, when the determination unit determines that the instruction to output the end information has been given.

According to an aspect of the present invention, there is provided a non-transitory computer-readable recording medium having recorded thereon a program that causes a computer to execute a process including storing, by a storage control unit, a plurality of output information items output from an application requesting output of a single output target information item as the plurality of output information items having the same identification information based on an output instruction, the plurality of output information items being stored in a predetermined save area upon changing the identification information of the plurality of output information items into identification information items that are different from each other; determining, by a determination unit, whether an instruction to output end information indicating an end of the single output target information item has been given after an instruction to output the single output target information item is given; and combining, by a combining unit, the plurality of output information items stored in the predetermined save area, when the instruction to output the end information is determined to have been given by the determination unit.

According to an aspect of the present invention, there is provided an output control method executed by an output control device, the output control method including giving an instruction for outputting a single output target information item, to an application requesting output of the single output target information item as a plurality of output information items having the same identification information based on an output instruction, and subsequently giving an instruction to output end information indicating an end of the single output target information item; storing the plurality of output information items output from the application in a predetermined save area upon changing the identification information of the plurality of output information items into identification information items that are different from each other; determining whether the instruction to output the end information has been given; and combining the plurality of output information items stored in the predetermined save area, when the instruction to output the end information is determined to have been given.

BRIEF DESCRIPTION OF THE DRAWINGS

Other objects, features and advantages of the present invention will become more apparent from the following detailed description when read in conjunction with the accompanying drawings, in which:

FIGS. 1A through 1C are for describing a file that is computerized upon being divided into a plurality of jobs;

FIG. 6 is a flowchart of an example of a data combining process;

FIGS. 7A and 7B illustrate examples of files to be combined as a job;

DETAILED DESCRIPTION OF THE PREFERRED EMBODIMENTS

Figure 2:
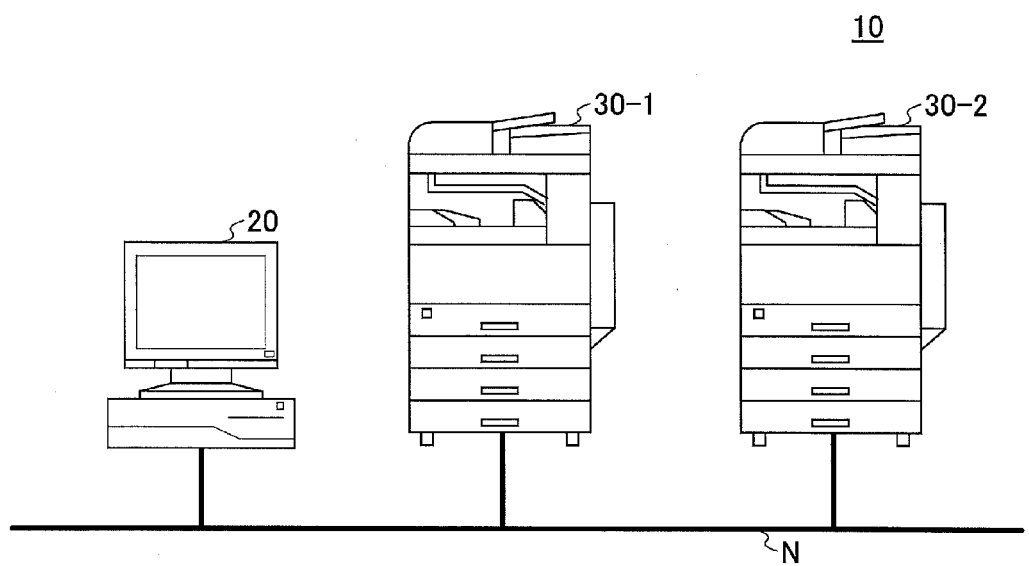
FIG. 2 illustrates an example of a schematic configuration of an output control system.

A description is given, with reference to the accompanying drawings, of embodiments of the present invention.
Example of File Computerized Upon being Divided into Plural Jobs Before describing the present embodiment, a description is given of a specific example of a file (output information) computerized upon dividing a single job (first output target information item) into a plurality of jobs, with reference to FIGS. 1A through 1C. FIGS. 1A through 1C are for describing a file that is computerized upon being divided into a plurality of jobs.

FIG. 1A illustrates an example of a Word (registered trademark) file including four pages. Word is an example of an application in which a single job is not divided into a plurality of jobs at the time of printing. When a print instruction is given with the use of an application with respect to the Word file illustrated in FIG. 1A, print data of a single job constituted by the respective pages is output to the computerizing driver.

Furthermore, FIG. 1B illustrates an example of an Excel (registered trademark) file including four sheets. Excel is an example of an application in which a single job is divided into a plurality of jobs at the time of printing. When a print instruction is given with the use of an application with respect to the Excel file illustrated in FIG. 1B, a single job (single output target information) is divided into a plurality of jobs, and the print data divided into a plurality of jobs (output information items) is output to the computerizing driver.

Note that the reason for dividing a single job into a plurality of jobs is that the respective sheets have different print qualities (resolutions), or the respective sheets have different color settings (color/monochrome); however, the reason is not so limited.

In the example of FIG. 1B, the job is divided into a plurality of jobs, in which the first job includes sheet 1 and sheet 2, and the second job includes sheet 3 and sheet 4. As described above, when a single job is divided into a plurality of jobs, the computerizing driver sends the print data corresponding to two jobs by sending each job at a time, e.g., the first job followed by the second job, to a local port monitor, for example.

In the local port monitor, it is possible to set the port from which data is output. For example, when a user sets the identification information for identifying a single job (single output target information) as "test.pdf", the first job of the print data to be output in a PDF file is output as "test.pdf" via the local port monitor. Similarly, the second job is output as "test.pdf" having the same identification information via the local port monitor. Therefore, in the conventional technology, by outputting the second job, the first job "test.pdf" is overwritten unintentionally.

As a result, as illustrated in FIG. 1C, only the print data (output information item) of the final job remains as the computerized data, and when the user opens this computerized file, only the job including the third and fourth sheets is displayed.

Therefore, the present embodiment that enables the user to confirm all of the output files of a single job, in a case where a single job is computerized upon being divided into a plurality of jobs having the same identification information by the application corresponding to the file type.
Schematic Configuration of Output Control System FIG. 2 illustrates an example of a schematic configuration of an output control system. As illustrated in FIG. 2, an output control system 10 includes a PC (Personal Computer) 20 that is an example of an output control device, and a printer 30 that is an example of an output device.

The PC 20 and the printer 30 are connected by a network N such as LAN (Local Area Network); however, the present embodiment is not so limited, the PC 20 and the printer 30 may be connected in any form as long as data communication is possible. Furthermore, the numbers of each of the devices included in the output control system 10 are not limited to those illustrated in FIG. 2.

In the PC 20, a printer driver for controlling the printer 30 and a computerizing driver for computerizing a file are installed. When the PC 20 acquires setting information relevant to processes to be executed by the printer 30, the PC 20 uses the acquired setting information to execute the processes with respect to the printer 30.

The printer 30 includes, for example, printers 30-1 and 30-2, and outputs the input image data (print data). For example, the printer 30 is an MFP (Multifunction Peripheral) including a printer function, a fax function, and a scanner function; however, the present embodiment is not so limited.

In the example of FIG. 2, the PC 20 switches the application according to the type of output file, by a management application for managing an output file created with document editing software and spreadsheet software, to print the file by the printer 30 or computerize the file by a computerizing driver.

When computerizing an output file, the PC 20 combines one or a plurality of jobs that have been obtained by dividing a single job, by an application corresponding to the type of output file, based on an end (termination) notification of an output file obtained from the management application. Accordingly, when the user opens the computerized file, the entire single job is displayed, and the user can confirm the entire job.

First Embodiment

Functional Configuration of PC 20-1

Figure 3:
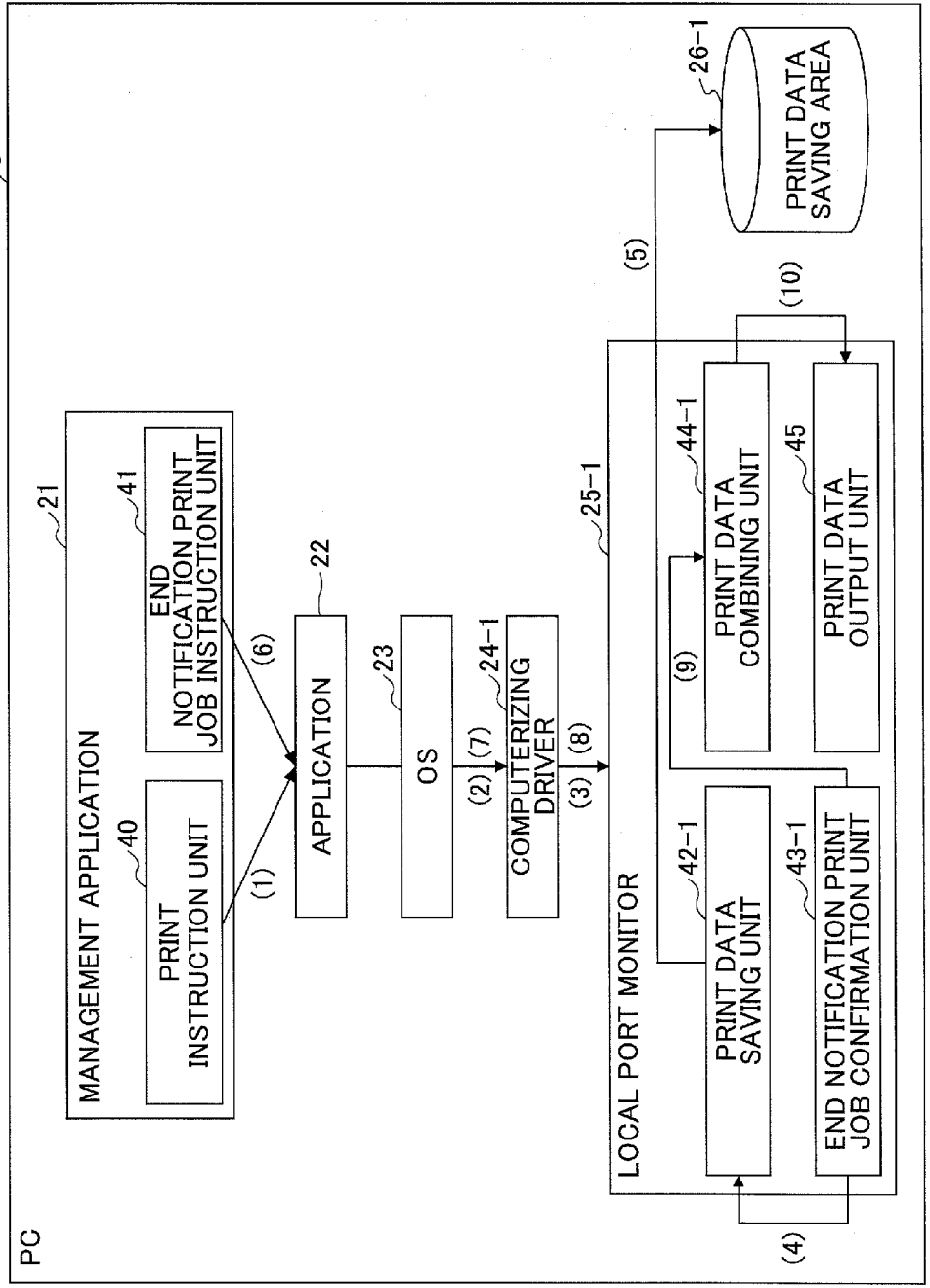
FIG. 3 illustrates an example of a functional configuration of an output control device according to a first embodiment.

FIG. 3 illustrates an example of a functional configuration of an output control device according to a first embodiment. As illustrated in FIG. 3, the PC 20-1 includes a management application 21 as an example of an output instruction unit, an application 22, an OS (Operating System) 23, a computerizing driver 24-1, and a local port monitor 25-1.

After instructing the output of a single output target information item (a single job), the management application 21 instructs the application 22 to output end information indicating the end of the single output target information item. The management application 21 includes, for example, a print instruction unit 40 and an end notification print job instruction unit 41.

In order to open an output file that is a target of computerization saved in a predetermined area, the print instruction unit 40 activates the application 22, selects the computerizing driver 24-1, instructs the print settings to be used when outputting the file, and instructs the printing.

After the printing instruction is given by the print instruction unit 40, the end notification print job instruction unit 41 opens an end notification file (for example, "end.xls") which is an example of end information saved in a predetermined area, specifies the computerizing driver 24-1, and instructs the printing.

An end notification file is prepared for each type of output file, and is used as a particular sign for reporting a notification of the end of printing of an output file (the end of a single job); however, the present embodiment is not so limited.

The application 22 is an application corresponding to the type of output file, including document editing software such as Word and spreadsheet software such as Excel. The application 22 requests to output a single output target information item (a single job) constituted by a plurality of sheets, as a plurality of output information items having the same identification information (print data divided into a plurality of jobs). The application 22 performs printing based on the computerizing driver 24-1 specified by the management application 21 and the specified print setting, via the OS 23.

The computerizing driver 24-1 computerizes the print data in a predetermined format based on setting contents specified by the application 22, and outputs the data to the local port monitor 25-1. As the computerizing driver 24-1, drivers such as XPS (XML Paper Specification), TIFF (Tagged Image File Format), and JPEG (Joint Photographic Experts Group) may be used, other than a PDF driver.

The local port monitor 25-1 includes a print data saving unit 42-1 as an example of a storage control unit, an end notification print job confirmation unit 43-1 as an example of a determining unit, a print data combining unit 44-1 as an example of a combining unit, and a print data output unit 45.

The print data saving unit 42-1 changes the identification information of output information items output from the application 22, into identification information items that are different from each other, and saves the output information items in a predetermined saving area. The print data saving unit 42-1 first outputs the print data obtained from the computerizing driver 24-1, and saves the print data in a print data saving area 26-1 in response to an instruction from the end notification print job confirmation unit 43-1.

For example, the print data saving unit 42-1 applies numbers, as the different identification information items, to job names (for example, document names or file names) (identification information) of print data (output information) divided into a plurality of jobs, by a method set in advance (for example, in the order the print data is input). Furthermore, for example, the print data saving unit 42-1 saves the print data divided into a plurality of jobs in the print data saving area 26-1.

Note that the predetermined area for saving a file and the print data saving area 26-1 described above, are predetermined storage areas in a storage unit such as a HDD (Hard Disk Drive) and a memory in the PC 20-1.

The end notification print job confirmation unit 43-1 determines whether the management application 21 has instructed output of end information. For example, the end notification print job confirmation unit 43-1 confirms whether a particular notification (sign) indicating the end of printing an output file set in advance (the end of a single job), from the end notification print job instruction unit 41.

Specifically, the end notification print job confirmation unit 43-1 confirms the job name of print data obtained from the computerizing driver 24-1. For example, when the end notification print job confirmation unit 43-1 determines that the job name of the print data is the job name (for example, "end.xls") for the end notification (end sign), the end notification print job confirmation unit 43-1 instructs the print data combining unit 44-1 to combine the print data saved in the print data saving area 26-1.

The print data combining unit 44-1 acquires the print data saved in the print data saving area 26-1 in response to an instruction from the end notification print job confirmation unit 43-1, combines the acquired print data, and outputs the combined print data to the print data output unit 45.

The print data output unit 45 outputs the print data combined by the print data combining unit 44-1, to a port that is specified in advance. The print data output unit 45 may output the print data to, for example, "C:/Users/Public/BoundJob.pdf", which is a port that is specified in advance; however, the present embodiment is not so limited.

A description is given of an example where the management application 21 instructs to computerize (output) a single file (4sheet.xls) as, for example, "BoundJob.pdf", and the application 22 divides the file into two jobs and instructs printing.

The management application 21 opens the file of "4sheet.xls" by the print instruction unit 40, selects the computerizing driver 24-1, makes a print setting, and instructs the application 22 to perform printing ((1) in FIG. 3).

The application 22 instructs the computerizing driver 24-1 to print the first job via the OS 23 ((2) in FIG. 3). The computerizing driver 24-1 creates print data based on the instructed print setting, and outputs the print data to the local port monitor 25-1 ((3) in FIG. 3).

The local port monitor 25-1 determines, by the end notification print job confirmation unit 43-1, whether the job name of the print data is, for example, "end.xls", which is for reporting an end notification. When the end notification print job confirmation unit 43-1 determines that the job name of the print data is not "end.xls", the end notification print job confirmation unit 43-1 instructs the print data saving unit 42-1 to save the print data ((4) in FIG. 3).

The print data saving unit 42-1 applies a number to the job name of the print data obtained from the end notification print job confirmation unit 43-1, for example, as "4sheet_X.prn" (X is a number that is a serial number), and saves the print data in the print data saving area 26-1 ((5) in FIG. 3).

The print data of the first job is saved as, for example, "4sheet_1.prn". Note that the print data of the second job obtained from the application 22 is also saved as, for example, "4sheet_2.prn" in the print data saving area 26-1, by the same process as that for the first job.

After the print instruction is given by the print instruction unit 40, the management application 21 opens, for example, an end notification file "end.xls" by the end notification print job instruction unit 41, selects the computerizing driver 24-1, and instructs the application 22 to perform printing ((6) in FIG. 3).

When the application 22 instructs the computerizing driver 24-1 to perform printing via the OS 23 ((7) in FIG. 3), the computerizing driver 24-1 creates print data, and outputs the print data to the local port monitor 25-1 ((8) in FIG. 3).

When the local port monitor 25-1 determines, by the end notification print job confirmation unit 43-1, that the job name of the print data is the job name for end notification (for example, "end.xls"), the local port monitor 25-1 instructs the print data combining unit 44-1 to combine the print data ((9) in FIG. 3).

The print data combining unit 44-1 combines the files (for example, 4sheet_1.prn, 4sheet_2.prn) saved in the print data saving area 26-1 in an appropriate order, for example, as "BoundJob.pdf", and outputs the combined file to the print data output unit 45 ((10) in FIG. 3).

As described above, when a single job (output request), which is based on an output instruction from the management application 21, is divided into a plurality of jobs by the application 22, it is possible to combine the output files, which have been divided in accordance with the plurality of jobs, into one job. Furthermore, the print data (output information) is combined in procedures after that of the computerizing driver 24-1, and therefore the print data can be combined in either one of a RAW spool format or an EMF (Enhanced MetaFile) spool format.

Note that spool data is data that is sent to the spooler where the data is temporarily accumulated or where the data passes through, when sending the data from an application to the printer in a Windows (registered trademark) environment. Furthermore, for example, a RAW format is a format in which the process depends on the printer, and an EMF format is an intermediate data format rendered with the use of a render command of Windows GDI (Graphic Device Interface).

Hardware Configuration

Figure 4:
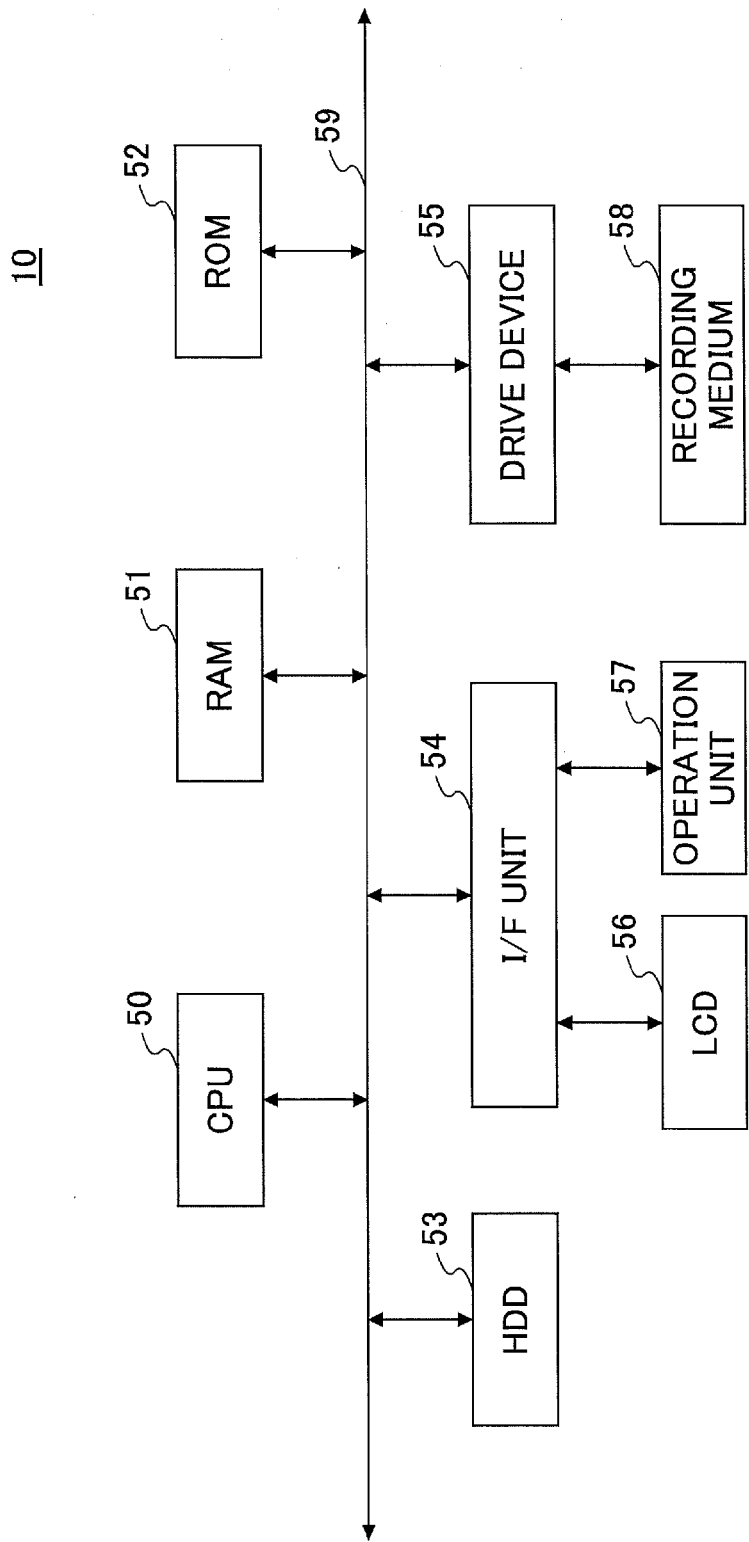
FIG. 4 illustrates an example of a hardware configuration of an output control device.

Next, a description is given of an example of a hardware configuration of an output control device according to the present embodiment. FIG. 4 illustrates an example of a hardware configuration of an output control device. Note that FIG. 4 illustrates an example of the hardware configuration of the PC 20 corresponding to FIG. 2; however, the same configuration is applicable to the printer 30.

As illustrated in FIG. 4, the PC 20 includes a CPU (Central Processing Unit) 50, a RAM (Random Access Memory) 51, a ROM (Read Only Memory) 52, a HDD 53, an I/F unit 54, a drive device 55, a LCD (Liquid Crystal Display) 56, an operation unit 57, and a recording medium 58.

The CPU 50, the RAM 51, the ROM 52, the HDD 53, the I/F unit 54, and the drive device 55 are connected via a bus 59. Furthermore, to the I/F unit 54, the LCD 56 and the operation unit 57 are connected. Note that in the case of the printer 30, an engine is included for executing image formation output and scanning.

The CPU 50 is a processor that controls the operations of the entire PC 20. The CPU 50 controls the execution of processes in the respective applications, the driver, and the local port monitor relevant to the PC 20-1 illustrated in FIG. 3.

The RAM 51 is a volatile storage medium in which reading/writing of information can be performed at high speed. The RAM 51 is used as a work area when the CPU 50 processes information.

The ROM 52 is a non-volatile storage medium from which information can be read. The ROM 52 stores programs such as firmware. The HDD 53 is a non-volatile storage medium in which reading/writing of information can be performed. The HDD 53 stores an OS, various control programs, and application programs.

The I/F unit 54 is connected to various hardware elements and networks. The LCD 56 is, for example, a display unit for displaying various screens for executing the processes (for example, a computerizing process) according to the present embodiment. The operation unit 57 is, for example, a keyboard, a mouse, various hardware buttons, a touch panel, and is a user interface for receiving information input from a user.

The output control program according to the present embodiment is provided by the recording medium 58 such as a CD-ROM. The recording medium 58 is set in the drive device 55, and the output control program included in the recording medium 58 is installed from the recording medium 58 via the drive device 55.

Note that as the recording medium 58 recording the program, various types of recording media may be used, including a recording medium for optically, electronically, or magnetically recording information such as a CD-ROM, a flexible disk, and a magnetooptic disc (MO), or a semiconductor memory for electrically recording information such as a flash memory.

In the above hardware configuration, a program stored in a storage medium such as the ROM 52, the HDD 53, and an optical disk, is loaded in the RAM 51, and the CPU 50 performs processing according to the loaded program, thereby constituting a software control unit for implementing the processes of the respective units in the PC 20-1 illustrated in FIG. 3, for example. By combining the software control unit constituted as described above with the hardware, it is possible to realize the functions of the respective devices constituting the system according to the present embodiment.

First Embodiment

Sequence of Output Control Process

Figure 5:
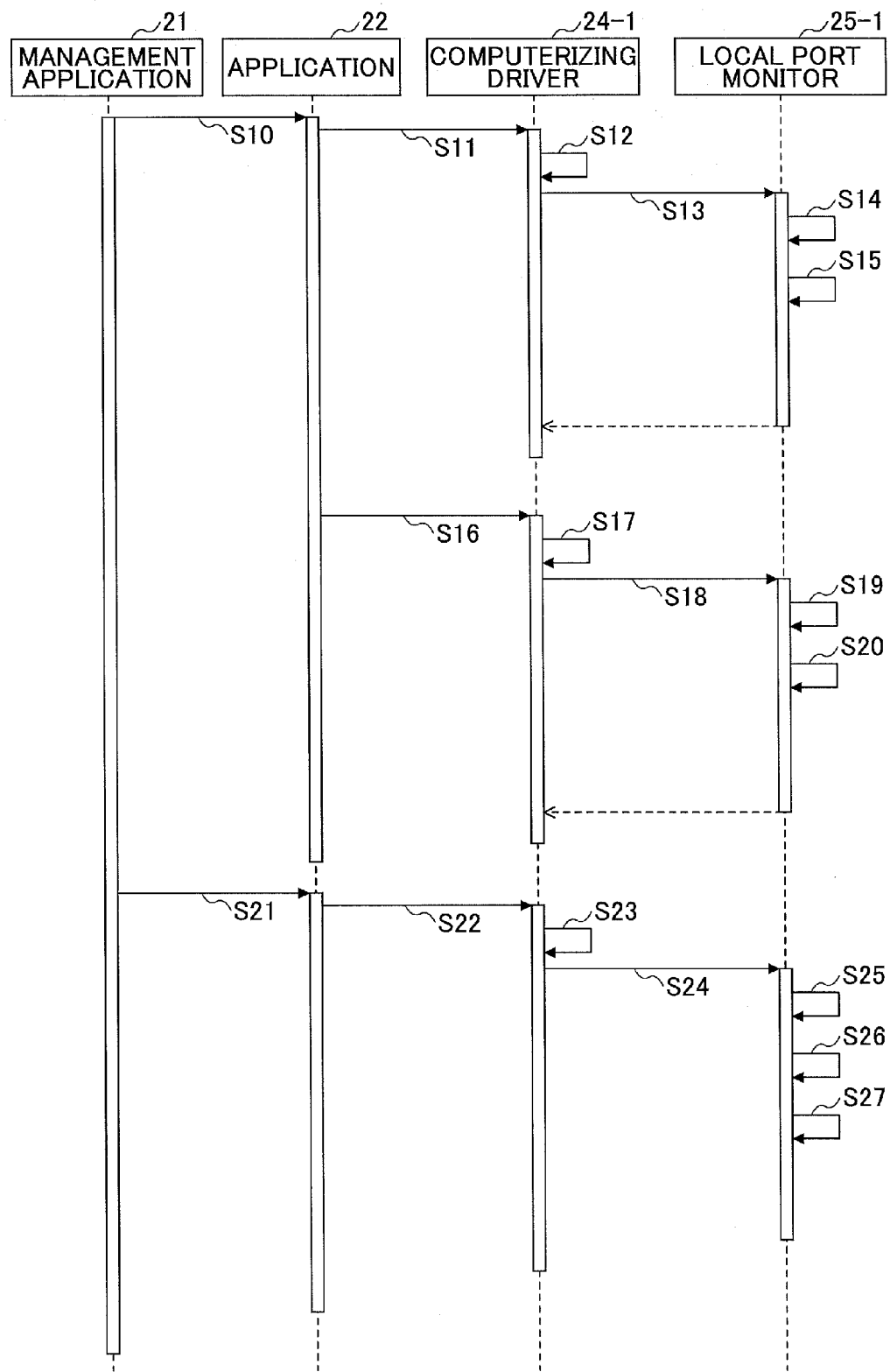
FIG. 5 illustrates an example of a sequence of an output control process according to the first embodiment.

The temporal flow of the processes in the above configurations is described by a sequence. FIG. 5 illustrates an example of a sequence of an output control process according to the first embodiment. The sequence illustrated in FIG. 5 is executed by the management application 21, the application 22, the computerizing driver 24-1, and the local port monitor 25-1.

In FIG. 5, the management application 21 instructs, by the print instruction unit 40, the application 22 to print a single output file (for example, 4sheet.xls) (step S10).

When the application 22 acquires the output file for which printing has been instructed by the print instruction unit 40, the application 22 instructs the computerizing driver 24-1 to print a first job (step S11). The computerizing driver 24-1 creates print data based on the instructed print setting (step S12), and outputs the print data to the local port monitor 25-1 (step S13).

The local port monitor 25-1 determines, by the end notification print job confirmation unit 43-1, whether the job name of the print data obtained from the computerizing driver 24-1 is a job name for end notification (for example, "end.xls") (step S14).

When the local port monitor 25-1 determines that the job name of the print data is not "end.xls" for end notification, the local port monitor 25-1 saves, by the print data saving unit 42-1, the print data (4sheet_1.prn) in the print data saving area 26-1 (step S15).

Next, the application 22 instructs the computerizing driver 24-1 to print a second job (step S16). The computerizing driver 24-1 creates print data based on the instructed print setting (step S17), and outputs the print data to the local port monitor 25-1 (step S18).

The local port monitor 25-1 determines, by the end notification print job confirmation unit 43-1, whether the job name of the print data obtained from the computerizing driver 24-1 is a job name for end notification "end.xls" (step S19). When the local port monitor 25-1 determines that the job name of the print data is not "end.xls" for end notification, the local port monitor 25-1 saves, by the print data saving unit 42-1, the print data (4sheet_2.prn) in the print data saving area 26-1 (step S20).

Next, after the print instruction is given by the print instruction unit 40, the management application 21 opens the end notification file by the end notification print job instruction unit 41, and instructs the application 22 to perform printing (step S21).

When the application 22 acquires the end notification file for which printing has been instructed by the end notification print job instruction unit 41, the application 22 instructs the computerizing driver 24-1 to perform printing (step S22). The computerizing driver 24-1 creates print data (step S23), and outputs the print data to the local port monitor 25-1 (step S24).

The local port monitor 25-1 determines, by the end notification print job confirmation unit 43-1, whether the job name of the print data is a job name for end notification "end.xls" (step S25). When the local port monitor 25-1 determines that the job name of the print data is "end.xls" for end notification, the local port monitor 25-1 combines, by the print data combining unit 44-1, the files saved in the print data saving area 26-1, in the order of, for example, the file numbers (step S26).

Next, the local port monitor 25-1 outputs, by the print data output unit 45, the file combined by the process of step S26 (step S27).

As described above, even when a single job is divided into a plurality of jobs by the application, the files are saved until the end notification is reported, and the saved files are combined and output according to the end notification. Accordingly, when the user opens the computerized file, the entirety of the single job is displayed.

Data Combining Process

Next, a description is given of the data combining process corresponding to the processes of steps S25 and S26 illustrated in FIG. 5. FIG. 6 is a flowchart of an example of a data combining process. In the process illustrated in FIG. 6, print data is created based on a print setting instructed by the computerizing driver 24-1, and when the print data is output to the local port monitor 25-1, the end notification print job confirmation unit 43-1 confirms the job name of the print data obtained from the computerizing driver 24-1 (step S30).

The end notification print job confirmation unit 43-1 determines whether the job name of the print data is a job name for end notification (for example, "end.xls") (step S31). When the end notification print job confirmation unit 43-1 determines that the job name of the print data is not a job name for end notification "end.xls" (NO in step S31), the end notification print job confirmation unit 43-1 applies, by the print data saving unit 42-1, a number that is a serial number to the job name of the print data, and moves the print data to the print data saving area 26-1 (step S32).

Furthermore, when the end notification print job confirmation unit 43-1 determines that the job name of the print data is the job name for end notification "end.xls" (YES in step S31), the print data combining unit 44-1 combines the files (print data) saved in the print data saving area 26-1 in an PDF format, for example (step S33). Next, the print data output unit 45 outputs the files combined by the process of step S33 to a port specified in advance (step S34), and ends the process.

Note that when a single job is divided into a plurality of jobs at the time of printing, after the process of step S32 described above, the print data of the next job is output from the computerizing driver 24-1 to the local port monitor 25-1, and therefore the processes from step S30 are repeated.

Example of Files to be Combined.

FIGS. 7A and 7B illustrate examples of files to be combined as a job. FIG. 7A illustrates an example where only the print data of the final job is displayed as in the conventional technology, and FIG. 7B illustrates an example where the print data of the combined files is displayed according to the present embodiment.

In the example of FIG. 7A, a single job is divided into a plurality of jobs, and the previous job is overwritten by the next job, and therefore only the print data of the final job is displayed. Meanwhile, in the example of FIG. 7B, the print data that has been divided into a plurality of jobs is combined into a single job, and the entire single job (test.pdf file) is displayed, which is constituted by the first page (combination of the first sheet and the second sheet) and the second page (combination of the third sheet and the fourth sheet).

As described above, even when a single job is divided into a plurality of jobs, the print data items which have been divided according to the plurality of jobs are combined together, and the entire single job is displayed, such that the user can confirm the entire single job as expected.

Second Embodiment

Functional Configuration of PC 20-2

Figure 8:
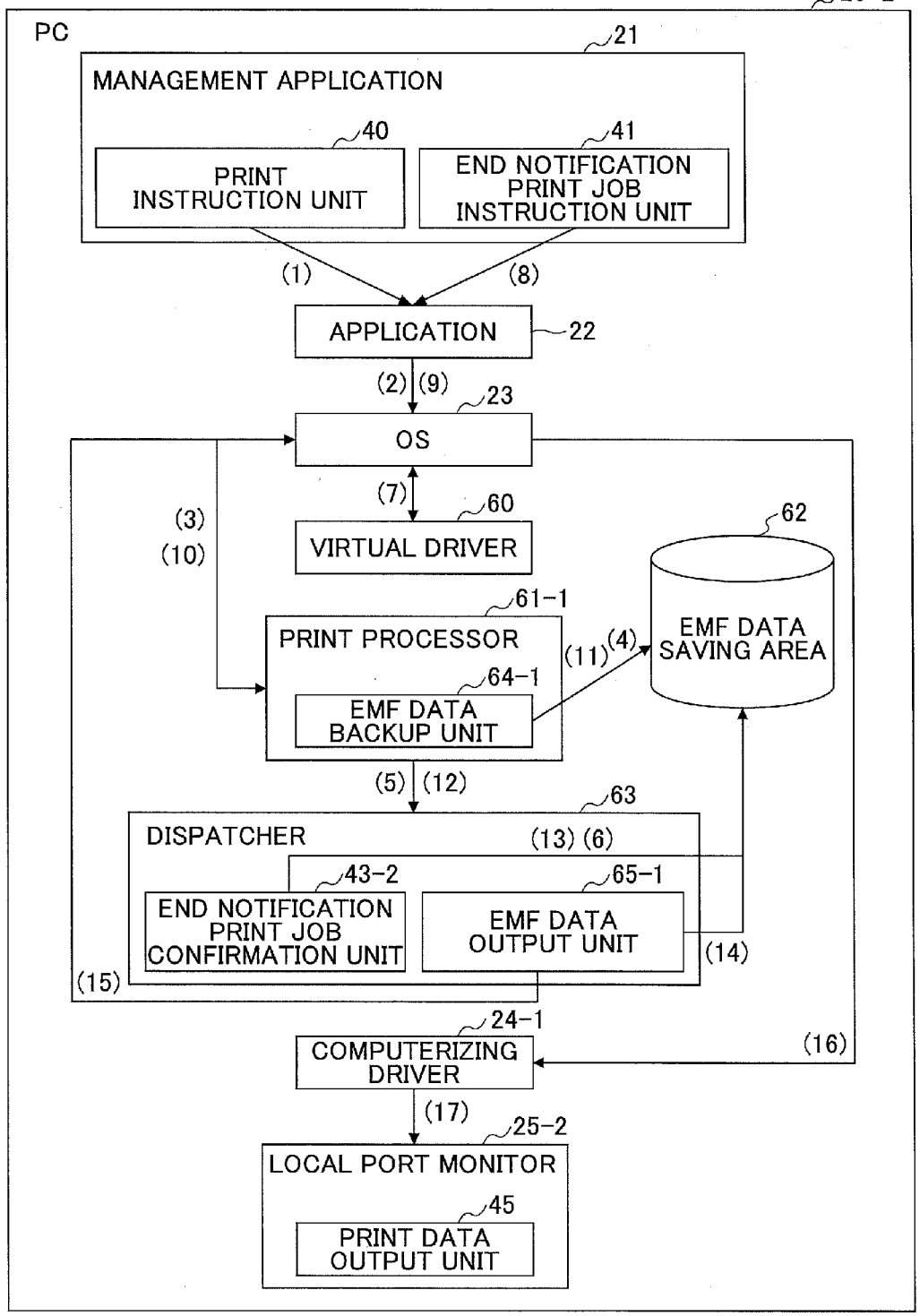
FIG. 8 illustrates an example of a functional configuration of an output control device according to a second embodiment.

FIG. 8 illustrates an example of a functional configuration of an output control device according to a second embodiment. The PC 20-2 that is an example of an output control device illustrated in FIG. 8 is different from the PC 20-1 according to the first embodiment in that a virtual driver (printer driver) 60, a print processor 61-1, an EMF data saving area 62, and a dispatcher 63 are included.

In the PC 20-2, the print processor 61-1 includes an EMF data backup unit 64-1, which is an example of a storage control unit. Furthermore, in the PC 20-2, the dispatcher 63 includes an end notification print job confirmation unit 43-2 as an example of a determination unit, and an EMF data output unit 65-1 as an example of a combining unit.

In the second embodiment, by having the above configuration, a single job divided into a plurality of jobs can be appropriately combined. Furthermore, the jobs are combined with the use of EMF data that does not depend on PDL (Page Description Language), and therefore there is no need for an implementation corresponding to PDL. In the following, the points that are different from the first embodiment are mainly described. Note that the same elements are denoted by the same reference numerals, and detailed descriptions are omitted.

In the example of FIG. 8, the virtual driver 60 creates print data in a predetermined format, based on a print setting specified by the application 22. For example, the virtual driver 60 creates print data (EMF data) in an EMF format that does not depend on PDL. Note that the virtual driver 60 is used according to need.

The print processor 61-1 includes the EMF data backup unit 64-1. The EMF data backup unit 64-1 acquires EMF data of one job or EMF data that has been divided into a plurality of jobs, from the application 22 via the OS 23.

The EMF data backup unit 64-1 applies numbers to the job names (for example, document names and file names) of the acquired EMF data, by a method set in advance (for example, the order in which the EMF data is input), and backs up the EMF data in the EMF data saving area 62. Note that the EMF data saving area 62 described above is a predetermined storage area in a storage unit such as the HDD and the memory in the PC 20-2.

The dispatcher 63 includes the end notification print job confirmation unit 43-2 and the EMF data output unit 65-1. The end notification print job confirmation unit 43-2 confirms the job name of the EMF data saved in the EMF data saving area 62, and determines whether the job name is a job name for end notification (for example, "end.xls").

The EMF data output unit 65-1 gives an output instruction of EMF data saved in the EMF data saving area 62 to the OS 23 within a single job, in response to an instruction from the end notification print job confirmation unit 43-2. Accordingly, it is possible to combine EMF data corresponding to a single job saved in, for example, the EMF data saving area 62.

The EMF data output unit 65-1 acquires the file handle of the EMF data from the OS 23 by using, for example, a GetEnhMetaFile( ) function that is the API (Application Programming Interface) of Windows. Furthermore, the EMF data output unit 65-1 gives an output instruction by using, for example, a PlayEnhMetaFile( ) function, with respect to the EMF data acquired from the EMF data saving area 62 based on the acquired file handle.

A local port monitor 25-2 includes the print data output unit 45. The print data output unit 45 can output the print data acquired from the computerizing driver 24-1 to a port specified in advance, such as "C:/Users/Public/BoundJob.pdf"; however, the present embodiment is not so limited.

A description is given of an example in which, similar to the first embodiment, when an instruction is given from the management application 21 to computerize a single file (4sheet.xls) as, for example, "BoundJob.pdf", the application 22 divides the file into two jobs and instructs printing.

The management application 21 opens the file of "4sheet.xls" by the print instruction unit 40, selects the computerizing driver 24-1, makes a print setting, and instructs the application 22 to perform printing ((1) in FIG. 8).

The application 22 instructs, via the OS 23, the print processor 61-1 to print the first job ((2) and (3) in FIG. 8). The print processor 61-1 adds, by the EMF data backup unit 64-1, a number to the job name of the EMF data such as "emf_data_X.EMF" (X is a number that is a serial number), and backs up the EMF data in the EMF data saving area 62 ((4) in FIG. 8). The EMF data of the first job is saved as, for example, "emf_data_1.EMF".

The print processor 61-1 activates the dispatcher 63, and normally ends ((5) in FIG. 8). The dispatcher 63 determines, by the end notification print job confirmation unit 43-2, whether there is a job name for end notification such as "end.EMF" among the job names of the EMF data saved in the EMF data saving area 62, and confirms that there is no "end.EMF" ((6) in FIG. 8).

Note that according to need, the virtual driver 60 creates print data in a predetermined file format based on a print instruction obtained from the application 22 via the OS 23 ((7) in FIG. 8).

Similar to the first job, the EMF data of the second job obtained from the application 22 is named, for example, "emf_data_2.EMF", and saved in the EMF data saving area 62. Furthermore, the end notification print job confirmation unit 43-2 of the dispatcher 63 determines whether the job name is a job name for end notification "end.EMF".

Next, after a print instruction is given by the print instruction unit 40, the management application 21 opens, by the end notification print job instruction unit 41, the file for end notification "end.xls", selects the computerizing driver 24-1, and instructs the application 22 to perform printing ((8) in FIG. 8). The application 22 instructs the print processor 61-1 to perform printing via the OS 23 ((9) and (10) in FIG. 8).

In the case of a file for end notification, the print processor 61-1 adds, by the EMF data backup unit 64-1, a job name for end notification "end.EMF" to the job name of the EMF data, and backs up the EMF data in the EMF data saving area 62 ((11) in FIG. 8).

The print processor 61-1 activates the dispatcher 63, and normally ends ((12) in FIG. 8). The dispatcher 63 determines, by the end notification print job confirmation unit 43-2, whether there is a job name for end notification such as "end.EMF" among the job names of the EMF data saved in the EMF data saving area 62 ((13) in FIG. 8).

When the EMF data output unit 65-1 determines, by the end notification print job confirmation unit 43-2, that there is a job name for end notification "end.EMF", the EMF data output unit 65-1 acquires a file handle of the EMF data saved in the EMF data saving area 62 from the OS 23 by using, for example, a GetEnhMetaFile( ) function.

Next, the EMF data output unit 65-1 acquires the EMF data from the EMF data saving area 62 based on the acquired file handle ((14) in FIG. 8), and gives an output instruction to the OS 23 by using a PlayEnhMetaFile( ) function ((15) in FIG. 8).

The OS 23 instructs the computerizing driver 24-1 to print the print data, in response to the output instruction from the EMF data output unit 65-1 ((16) in FIG. 8). The computerizing driver 24-1 creates print data based on the instructed print setting, and outputs the print data to the local port monitor 25-2 ((17) in FIG. 8).

As described above, even when a single job is divided into a plurality of jobs by the application 22, the output files which have been divided according to the plurality of jobs can be combined together as a single job. Furthermore, data in an EMF format that does not depend on PDL is used, and therefore there is no need for an implementation corresponding to PDL.

Furthermore, the dispatcher 63 operates according to a process separate from the spooler process, and therefore a preview screen can be displayed. Therefore, the user can change the output order of pages on the preview screen.

Second Embodiment

Sequence of Output Control Process

Figure 9:
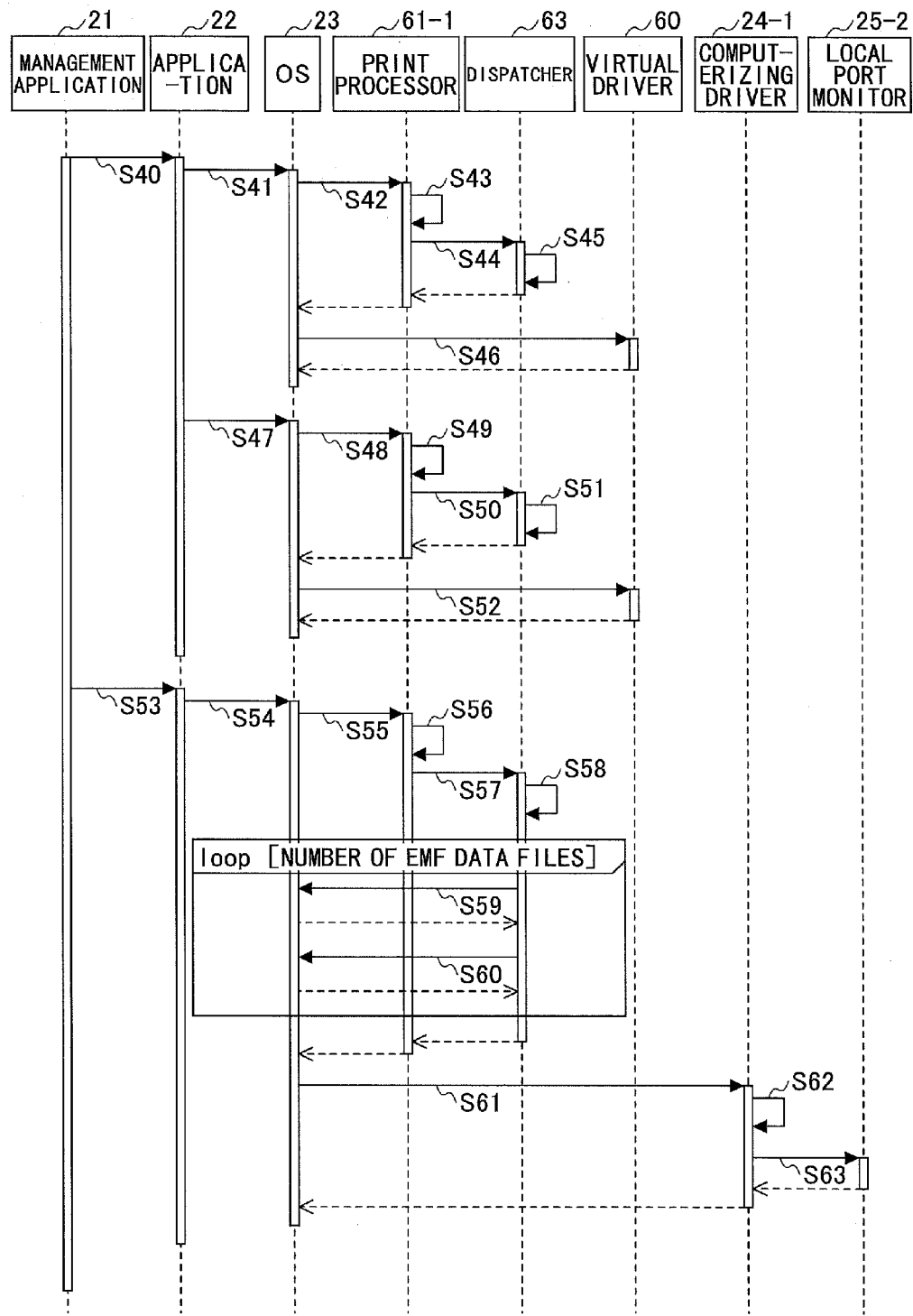
FIG. 9 is a sequence diagram of an example of an output control process according to the second embodiment.

FIG. 9 is a sequence diagram of an example of an output control process according to the second embodiment. The sequence illustrated in FIG. 9 is executed by the management application 21, the application 22, the OS 23, the print processor 61-1, the dispatcher 63, the virtual driver 60, the computerizing driver 24-1, and the local port monitor 25-2.

In FIG. 9, the management application 21 instructs, by the print instruction unit 40, the application 22 to print a single output file (for example, 4sheet.xls) (step S40).

When the application 22 acquires the output file for which printing is instructed by the print instruction unit 40, the application 22 instructs the OS 23 to print the first job (step S41). The OS 23 reports a notification of the print instruction of the first job to the print processor 61-1 (step S42). The print processor 61-1 applies, by the EMF data backup unit 64-1, a number to the job name of the EMF data such as "emf_data_X.EMF" (X is a number that is a serial number), and backs up the EMF data in the EMF data saving area 62 (step S43).

Next, the print processor 61-1 activates the dispatcher 63 (step S44). The dispatcher 63 determines, by the end notification print job confirmation unit 43-2, whether there is a job name for end notification such as "end.EMF" among the job names of the EMF data saved in the EMF data saving area 62 (step S45). Note that according to need, the OS 23 sends a notification of the print instruction to the virtual driver 60 (step S46), and acquires print data in a predetermined file format created by the virtual driver 60.

Next, when the application 22 instructs the OS 23 to print the second job (step S47), the OS 23 sends a notification of the print instruction for the second job to the print processor 61-1 (step S48). Similar to the first job, the print processor 61-1 adds a number such as "emf_data_2.EMF" to the EMF data of the second job obtained from the application 22, and backs up the EMF data in the EMF data saving area 62 (step S49).

Next, the print processor 61-1 activates the dispatcher 63 (step S50). The dispatcher 63 determines, by the end notification print job confirmation unit 43-2, whether there is a job name for end notification such as "end.EMF" among the job names of the EMF data saved in the EMF data saving area 62 (step S51). Note that according to need, the OS 23 sends a notification of the print instruction to the virtual driver 60 (step S52), and acquires print data in a predetermined file format created by the virtual driver 60.

Next, after the print instruction unit 40 has instructed the printing, the management application 21 opens, by the end notification print job instruction unit 41, the end notification file "end.xls", selects the computerizing driver 24-1, and instructs the application 22 to perform printing (step S53). When the application 22 instructs the OS 23 to print the job for end notification (step S54), the OS 23 sends a notification of the print instruction of the job for end notification to the print processor 61-1 (step S55).

The print processor 61-1 adds, by the EMF data backup unit 64-1, a job name for end notification such as "end.EMF" to the job name of the EMF data, and backs up the EMF data in the EMF data saving area 62 (step S56).

Next, the print processor 61-1 activates the dispatcher 63 (step S57). The dispatcher 63 determines, by the end notification print job confirmation unit 43-2, whether there is a job name for end notification such as "end.EMF" among the job names of the EMF data saved in the EMF data saving area 62 (step S58).

When the end notification print job confirmation unit 43-2 determines that there is a job name for end notification "end.EMF", the dispatcher 63 acquires, by the EMF data output unit 65-1, a file handle of the EMF data saved in the EMF data saving area 62 from the OS 23 by using, for example, a GetEnhMetaFile( ) function (step S59).

Next, the dispatcher 63 acquires EMF data from the EMF data saving area 62 based on the acquired file handle, and with respect to the acquired EMF data, the dispatcher 63 gives an output instruction to the OS 23 by using a PlayEnhMetaFile( ) function (step S60).

The OS 23 instructs the computerizing driver 24-1 to print the print data, by regarding the EMF data acquired from the dispatcher 63 as a single job (step S61). The computerizing driver 24-1 creates print data based on the instructed print setting (step S62), and outputs the print data to the local port monitor 25-2 (step S63).

In the second embodiment described above, when printing the job for end notification, the dispatcher 63 gives, to the OS 23, an instruction to output EMF data backed up in the EMF data saving area 62. The OS 23 instructs the computerizing driver 24-1 to print the data as a single job, and the computerizing driver 24-1 creates and outputs the print data. Accordingly, EMF data that has been divided into a plurality of jobs can be finally output as print data of a single job.

Third Embodiment

Functional Configuration of PC 20-3

Figure 10:
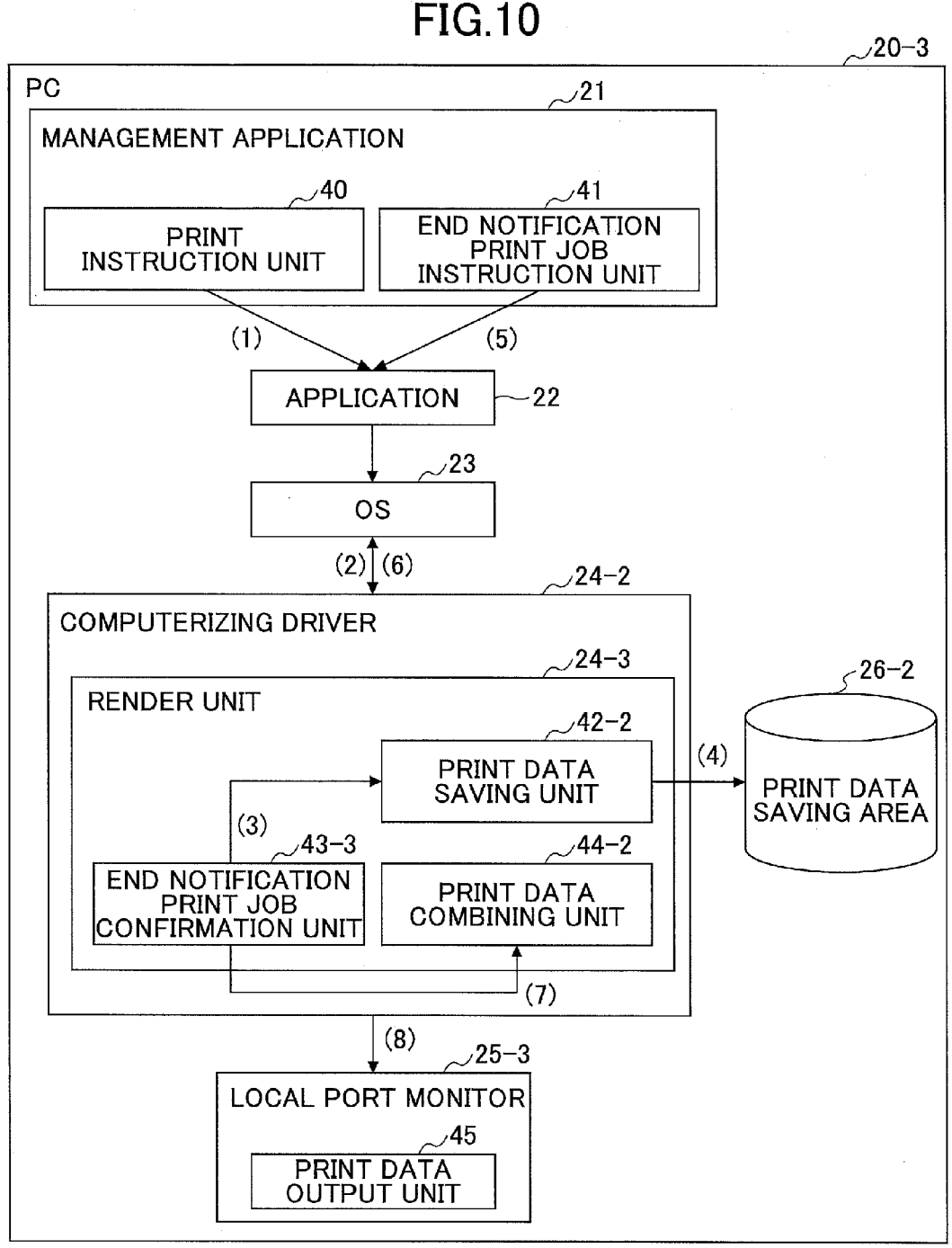
FIG. 10 illustrates an example of a functional configuration of an output control device according to a third embodiment.

FIG. 10 illustrates an example of a functional configuration of an output control device according to a third embodiment. In the PC 20-3 that is an example of an output control device illustrated in FIG. 10, a computerizing driver 24-2 includes a render unit 24-3. The PC 20-3 is different from the PC 20-1 according to the first embodiment in that the render unit 24-3 of the computerizing driver 24-2 includes a print data saving unit 42-2 as an example of a storage control unit, an end notification print job confirmation unit 43-3 as an example of a determination unit, and a print data combining unit 44-2 as an example of a combining unit.

In the third embodiment, by having the above configuration, a single job divided into a plurality of jobs can be appropriately combined. Furthermore, in order to combine the print data in the computerizing driver 24-2, for example, either the RAW spool format or the EMF spool format can be used. In the following, the points that are different from the first embodiment are mainly described. Note that the same elements are denoted by the same reference numerals, and detailed descriptions are omitted.

A description is given of an example similar to the first embodiment in which an instruction is given from the management application 21 to computerize a single file (4sheet.xls) as "BoundJob.pdf", and the application 22 divides the file into two jobs and instructs printing.

The management application 21 opens the file of "4sheet.xls" by the print instruction unit 40, selects the computerizing driver 24-2, makes a print setting, and instructs the application 22 to perform printing ((1) in FIG. 10).

The application 22 instructs, via the OS 23, the computerizing driver 24-2 to print the first job ((2) in FIG. 10). The render unit 24-3 of the computerizing driver 24-2 determines, by the end notification print job confirmation unit 43-3, whether the job name of the print data is a job name for end notification (for example, "end.xls"). When the end notification print job confirmation unit 43-3 determines that the job name of the print data is not a job name for end notification "end.xls", the end notification print job confirmation unit 43-3 instructs the print data saving unit 42-2 to save the print data ((3) in FIG. 10).

The print data saving unit 42-2 adds a number to the job name of the print data obtained from the end notification print job confirmation unit 43-3, such as "4sheet_X.prn" (X is a number that is a serial number), and saves the print data in a print data saving area 26-2 ((4) in FIG. 10).

The print data of the first job is saved as, for example, "4sheet_1.prn". Note that the print data of the second job obtained from the application 22 is also saved in the print data saving area 26-2 as, for example, "4sheet_2.prn", by the same process as that for the first job.

Next, after the print instruction is given by the print instruction unit 40, the management application 21 opens, for example, an end notification file "end.xls" by the end notification print job instruction unit 41, selects the computerizing driver 24-2, and instructs the application 22 to perform printing ((5) in FIG. 10). The application 22 instructs the computerizing driver 24-2 to perform printing via the OS 23 ((6) in FIG. 10).

When the end notification print job confirmation unit 43-3 determines that the job name of the print data is a job name for end notification such as "end.xls", the end notification print job confirmation unit 43-3 instructs the print data combining unit 44-2 to combine the print data ((7) in FIG. 10).

The print data combining unit 44-2 combines the files (for example, 4sheet_1.prn, 4sheet_2.prn) saved in the print data saving area 26-2, for example, as "BoundJob.pdf", and outputs the combined file to the local port monitor 25-3 ((8) in FIG. 10).

As described above, even when a single job is divided into a plurality of jobs by the application 22, the output files which have been divided according to the plurality of jobs can be combined together as a single job. Furthermore, by combining the print data in the render unit 24-3 of the computerizing driver 24-2, for example, the print data can be combined in the RAW spool format or the EMF spool format.

Third Embodiment

Sequence of Output Control Process

Figure 11:
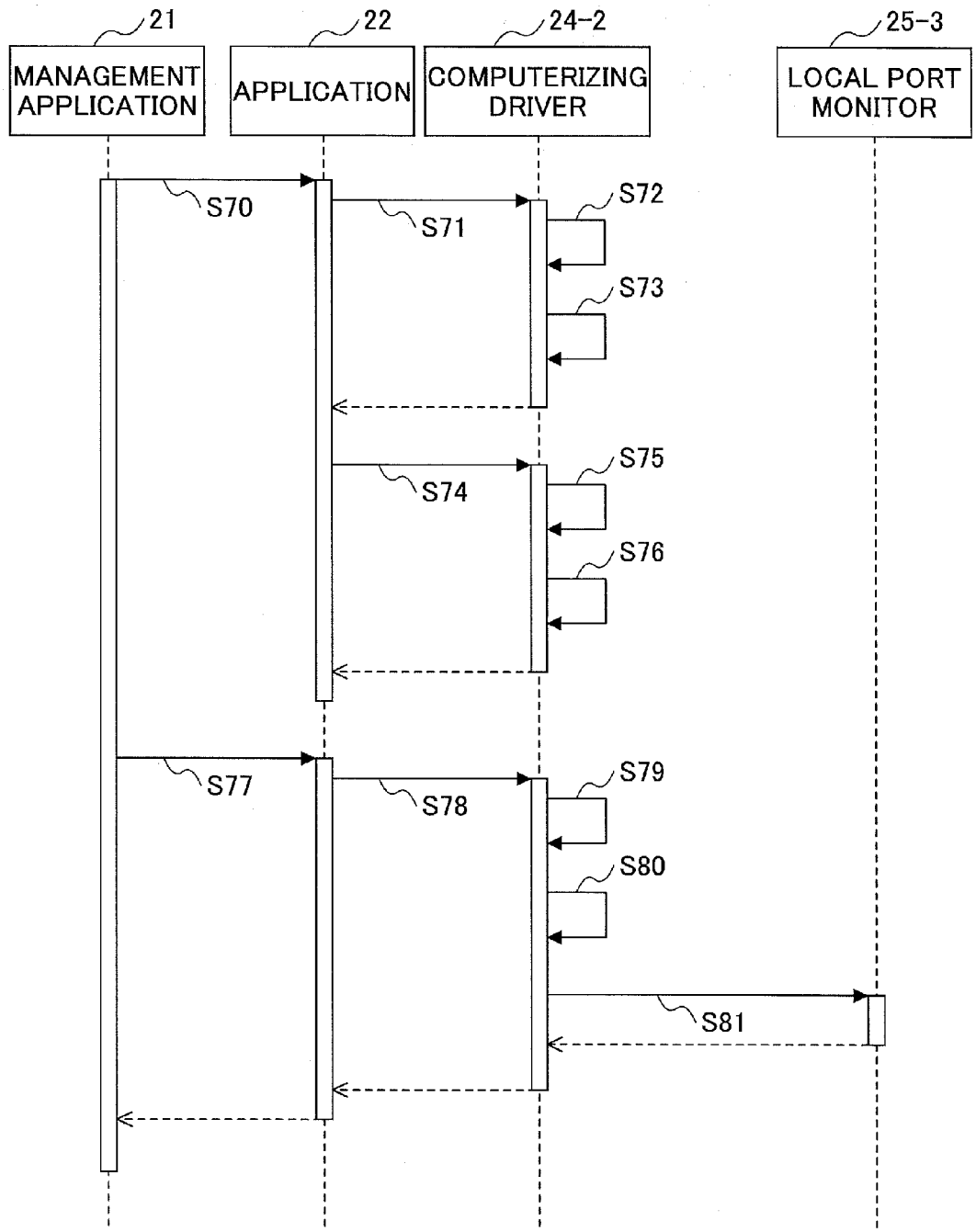
FIG. 11 is a sequence diagram of an example of an output control process according to the third embodiment.

FIG. 11 is a sequence diagram of an example of an output control process according to the third embodiment. The sequence illustrated in FIG. 11 is executed by the management application 21, the application 22, the computerizing driver 24-2, and the local port monitor 25-3. Note that the OS 23 is omitted in the description.

In FIG. 11, the management application 21 instructs, by the print instruction unit 40, the application 22 to print a single output file (for example, 4sheet.xls) (step S70).

The application 22 instructs the computerizing driver 24-2 to print the first job (step S71). The render unit 24-3 of the computerizing driver 24-2 determines, by the end notification print job confirmation unit 43-3, whether the job name of the print data is a job name for end notification "end.xls" (step S72). When the end notification print job confirmation unit 43-3 determines that the job name of the print data is not a job name for end notification "end.xls", the end notification print job confirmation unit 43-3 instructs the print data saving unit 42-2 to save the print data (step S73). Note that in the process of step S73, the print data saving unit 42-2 adds a number to the job name of the print data obtained from the end notification print job confirmation unit 43-3, such as "4sheet_X.prn" (X is a number that is a serial number), and saves the print data in a print data saving area 26-2.

The application 22 instructs the computerizing driver 24-2 to print the second job (step S74). Similar to the first job, the render unit 24-3 of the computerizing driver 24-2 determines, by the end notification print job confirmation unit 43-3, whether the job name of the print data is a job name for end notification, and when the end notification print job confirmation unit 43-3 determines that the job name of the print data is not a job name for end notification, the end notification print job confirmation unit 43-3 instructs the print data saving unit 42-2 to save the print data (step S76).

Next, after the print instruction is given by the print instruction unit 40, the management application 21 opens, for example, an end notification file "end.xls" by the end notification print job instruction unit 41, selects the computerizing driver 24-2, and instructs the application 22 to perform printing (step S77). The application 22 instructs the computerizing driver 24-2 to perform printing (step S78).

The render unit 24-3 of the computerizing driver 24-2 determines, by the end notification print job confirmation unit 43-3, whether the job name of the print data is a job name for end notification "end.xls" (step S79). When the end notification print job confirmation unit 43-3 determines that the job name of the print data is a job name for end notification, the end notification print job confirmation unit 43-3 instructs the print data combining unit 44-2 to combine the print data (step S80).

Note that in the process of step S80, the print data saving unit 42-2 combines the files (for example, 4sheet_1.prn, 4sheet_2.prn) saved in the print data saving area 26-2, for example, as "BoundJob.pdf". The computerizing driver 24-2 outputs the combined file to the local port monitor 25-3 (step S81).

The third embodiment described above is different from the first embodiment in that the computerizing driver can perform the process of determining whether the job name of the print data is a job name for end notification, and the process of combining the print data.

Fourth Embodiment

Functional Configuration of PC 20-4

Figure 12:
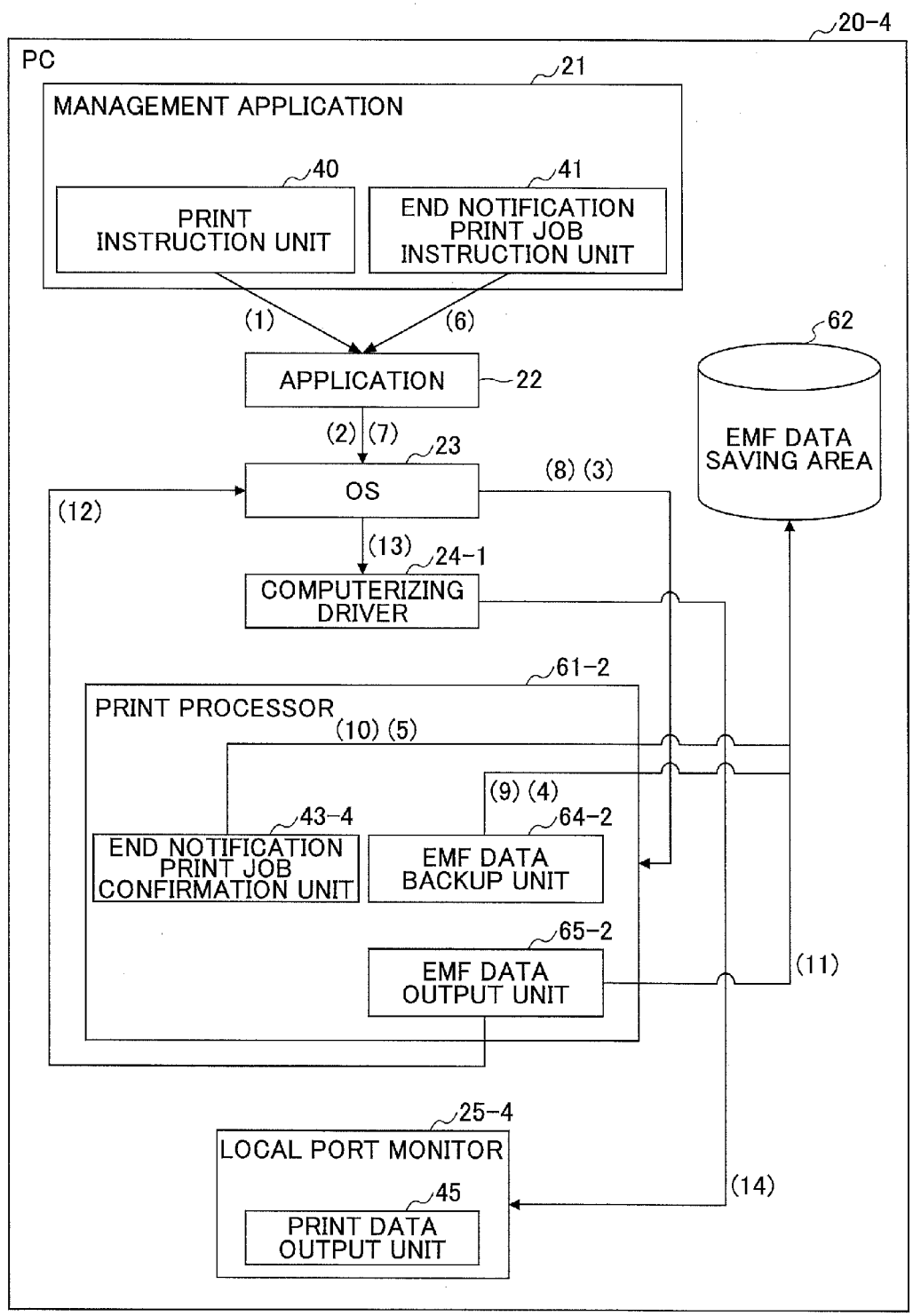
FIG. 12 illustrates an example of a functional configuration of an output control device according to a fourth embodiment.

FIG. 12 illustrates an example of a functional configuration of an output control device according to a fourth embodiment. The PC 20-4 that is an example of an output control device illustrated in FIG. 12 includes a print processor 61-2. The PC 20-4 is different from the PC 20-1 according to the first embodiment in that the print processor 61-2 includes an EMF data backup unit 64-2 as an example of a storage control unit, an end notification print job confirmation unit 43-4 as an example of a determination unit, and an EMF data output unit 65-2 as an example of a combining unit.

In the fourth embodiment, by having the above configuration, a single job divided into a plurality of jobs can be appropriately combined. Furthermore, similar to the second embodiment, the jobs are combined with the use of EMF data, and therefore there is no need for an implementation corresponding to PDL. Furthermore, the PC 20-4 can be realized by a smaller configuration than that of the second embodiment.

A description is given of an example in which, similar to the first embodiment, when an instruction is given from the management application 21 to computerize a single file (4sheet.xls) as, for example, "BoundJob.pdf", the application 22 divides the file into two jobs and instructs printing.

The management application 21 opens the file of "4sheet.xls" by the print instruction unit 40, selects the computerizing driver 24-1, makes a print setting, and instructs the application 22 to perform printing ((1) in FIG. 12).

The application 22 instructs, via the OS 23, the print processor 61-2 to print the first job ((2) and (3) in FIG. 12). The print processor 61-2 adds, by the EMF data backup unit 64-2, a number to the job name of the EMF data such as "emf_data_X.EMF" (X is a number that is a serial number), and backs up the EMF data in the EMF data saving area 62 ((4) in FIG. 12). The EMF data of the first job is saved as, for example, "emf_data_1.EMF".

The print processor 61-2 determines, by the end notification print job confirmation unit 43-4, whether there is a job name for end notification such as "end.EMF" among the job names of the EMF data saved in the EMF data saving area 62. When the print processor 61-2 confirms, by the end notification print job confirmation unit 43-4, that there is no job name for end notification such as "end.EMF", the print processor 61-2 normally ends the process ((5) in FIG. 12).

Similar to the first job, the EMF data of the second job obtained from the application 22 is named, for example, "emf_data_2.EMF", and saved in the EMF data saving area 62. Furthermore, the end notification print job confirmation unit 43-4 determines whether the job name is a job name for end notification "end.EMF".

Next, after a print instruction is given by the print instruction unit 40, the management application 21 opens, by the end notification print job instruction unit 41, the file for end notification "end.xls", selects the computerizing driver 24-1, and instructs the application 22 to perform printing ((6) in FIG. 12). The application 22 instructs the print processor 61-2 to perform printing via the OS 23 ((7) and (8) in FIG. 12).

In the case of a file for end notification, the print processor 61-2 adds, by the EMF data backup unit 64-2, a job name for end notification "end.EMF" to the job name of the EMF data, and backs up the EMF data in the EMF data saving area 62 ((9) in FIG. 12).

The print processor 61-2 determines, by the end notification print job confirmation unit 43-4, whether there is a job name for end notification such as "end.EMF" among the job names of the EMF data saved in the EMF data saving area 62 ((10) in FIG. 12).

When the print processor 61-2 determines, by the end notification print job confirmation unit 43-4, that there is a job name for end notification "end.EMF", the EMF data output unit 65-2 acquires a file handle of the EMF data saved in the EMF data saving area 62 from the OS 23 by using, for example, a GetEnhMetaFile( ) function.

Next, the EMF data output unit 65-2 acquires the EMF data from the EMF data saving area 62 based on the acquired file handle ((11) in FIG. 12), and gives an output instruction to the OS 23 by using a PlayEnhMetaFile( ) function ((12) in FIG. 12).

The OS 23 instructs the computerizing driver 24-1 to print the print data, in response to the output instruction from the EMF data output unit 65-2 ((13) in FIG. 12). The computerizing driver 24-1 creates print data based on the instructed print setting, and outputs the print data to the local port monitor 25-4 ((14) in FIG. 12).

As described above, even when a single job is divided into a plurality of jobs by the application 22, the output files which have been divided according to the plurality of jobs can be combined together as a single job. Furthermore, data in an EMF format that does not depend on PDL is used, and therefore there is no need for an implementation corresponding to PDL. Furthermore, the PC 20-4 can be realized by a smaller configuration than that of the second embodiment.

Fourth Embodiment

Sequence of Output Control Process

Figure 13:
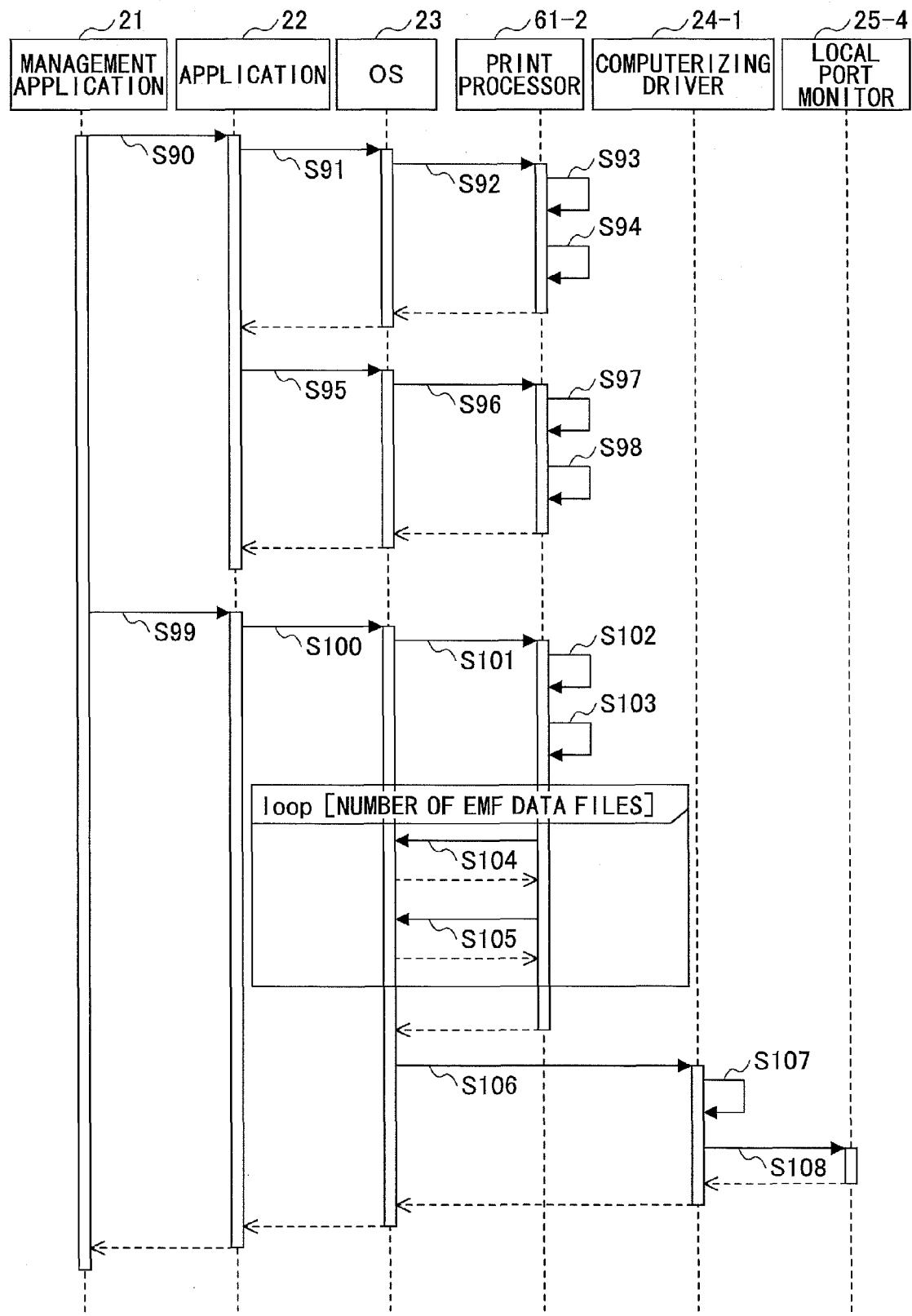
FIG. 13 is a sequence diagram of an example of an output control process according to the fourth embodiment.

FIG. 13 is a sequence diagram of an example of an output control process according to the fourth embodiment. The sequence illustrated in FIG. 13 is executed by the management application 21, the application 22, the OS 23, the print processor 61-2, the computerizing driver 24-1, and the local port monitor 25-4.

In FIG. 13, the management application 21 opens the file of "4sheet.xls" by the print instruction unit 40, selects the computerizing driver 24-1, makes a print setting, and instructs the application 22 to perform printing (step S90).

When the application 22 acquires the output file for which printing is instructed by the print instruction unit 40, the application 22 instructs the OS 23 to print the first job (step S91). The OS 23 instructs the printing of the first job to the print processor 61-2 (step S92). The print processor 61-2 applies, by the EMF data backup unit 64-2, a number to the job name of the EMF data such as "emf_data_X.EMF" (X is a number that is a serial number), and backs up the EMF data in the EMF data saving area 62 (step S93).

The print processor 61-2 determines, by the end notification print job confirmation unit 43-4, whether there is a job name for end notification such as "end.EMF" among the job names of the EMF data saved in the EMF data saving area 62 (step S94). When the print processor 61-2 determines, by the end notification print job confirmation unit 43-4, that there is no job name for end notification such as "end.EMF", the print processor 61-2 normally ends the process.

Next, when the application 22 instructs the OS 23 to print the second job (step S95), the OS 23 sends a notification of the print instruction for the second job to the print processor 61-2 (step S96). Similar to the first job, the print processor 61-2 adds a number such as "emf_data_2.EMF" to the EMF data of the second job obtained from the application 22, and backs up the EMF data in the EMF data saving area 62 (step S97).

Next, the print processor 61-2 determines, by the end notification print job confirmation unit 43-4, whether there is a job name for end notification such as "end.EMF" among the job names of the EMF data saved in the EMF data saving area 62 (step S98). When the print processor 61-2 determines, by the end notification print job confirmation unit 43-4, that there is no job name for end notification such as "end.EMF", the print processor 61-2 normally ends the process.

Next, after the print instruction unit 40 has instructed the printing, the management application 21 opens, by the end notification print job instruction unit 41, the end notification file "end.xls", selects the computerizing driver 24-1, and instructs the application 22 to perform printing (step S99). When the application 22 instructs the OS 23 to print the job for end notification (step S100), the OS 23 sends a notification of the print instruction of the job for end notification to the print processor 61-2 (step S101).

The print processor 61-2 adds, by the EMF data backup unit 64-2, a job name for end notification such as "end.EMF" to the job name of the EMF data in the case of a file for end notification, and backs up the EMF data in the EMF data saving area (step S102).

The print processor 61-2 determines, by the end notification print job confirmation unit 43-4, whether there is a job name for end notification such as "end.EMF" among the job names of the EMF data saved in the EMF data saving area 62 (step S103).

When the print processor 61-2 determines, by the end notification print job confirmation unit 43-4, that there is a job name for end notification "end.EMF", the EMF data output unit 65-2 acquires a file handle of the EMF data saved in the EMF data saving area 62 from the OS 23 by using, for example, a GetEnhMetaFile( ) function (step S104).

Next, the EMF data output unit 65-2 acquires EMF data from the EMF data saving area 62 based on the acquired file handle, and with respect to the acquired EMF data, the EMF data output unit 65-2 gives an output instruction to the OS 23 by using a PlayEnhMetaFile( ) function (step S105).

The OS 23 instructs the computerizing driver 24-1 to print the print data, in response to the output instruction from the EMF data output unit 65-2 (step S106). The computerizing driver 24-1 creates print data based on the instructed print setting (step S107), and outputs the print data to the local port monitor 25-4 (step S108).

In the fourth embodiment described above, the processes performed by the dispatcher 63 of the second embodiment can be executed by the print processor 61-2.

According to the embodiments described above, a plurality of output information items which have been divided by an application can be combined together. Note that in the above embodiments, a description is given with the use of a PC as one example of the information processing device; however, the information processing device may also be a smartphone, a tablet terminal, a server, etc., and the embodiments are also applicable to an image processing device such as a MFP. Furthermore, part of or all of the first through fourth embodiments may be combined together according to need.

According to one embodiment of the present invention, an output control device and an output control method are provided, in which a plurality of output information items divided by an application can be combined.

The output control device and the output control method are not limited to the specific embodiments described herein, and variations and modifications may be made without departing from the spirit and scope of the present invention.

The present application is based on and claims the benefit of priority of Japanese Priority Patent Application No. 2013-118062, filed on Jun. 4, 2013, Japanese Priority Patent Application No. 2014-100858, filed on May 14, 2014, the entire contents of which are hereby incorporated herein by reference.

What is claimed is:

1. An output control device comprising:
an output instruction unit configured to give an instruction for outputting a single output target information item, to an application requesting output of the single output target information item as a plurality of output information items having the same identification information based on an output instruction, and to subsequently give an instruction to output end information indicating an end of outputting of the single output target information item;
a storage control unit configured to store the plurality of output information items output from the application in a predetermined save area upon changing the identification information of the plurality of output information items into identification information items that are different from each other;
a determination unit configured to determine whether the instruction to output the end information has been given by the output instruction unit; and
a combining unit configured to combine the plurality of output information items stored in the predetermined save area, when the determination unit determines that the instruction to output the end information indicating the end of outputting of the single output target information item has been given,
wherein the output instruction unit uses an end notification file as the end information, and
wherein the determination unit determines whether the end information has been output based on a file name of the end notification file obtained from the output instruction unit.

2. The output control device according to claim 1, wherein the determination unit comprises at least one of a local port monitor, a dispatcher, a computerizing driver, and a print processor.

3. The output control device according to claim 1, wherein the combining unit comprises at least one of a local port monitor, a dispatcher, a computerizing driver, and a print processor.

4. The output control device according to claim 1, wherein the combining unit combines the plurality of output information items in a RAW format or an EMF format.

5. A non-transitory computer-readable recording medium having recorded thereon a program that causes a computer to execute a process comprising:
storing, by a storage control unit, a plurality of output information items output from an application requesting output of a single output target information item as the plurality of output information items having the same identification information based on an output instruction, the plurality of output information items being stored in a predetermined save area upon changing the identification information of the plurality of output information items into identification information items that are different from each other;
determining, by a determination unit, whether an instruction to output end information indicating an end of outputting of the single output target information item has been given after an instruction to output the single output target information item is given; and
combining, by a combining unit, the plurality of output information items stored in the predetermined save area, when the instruction to output the end information indicating the end of outputting of the single output target information item has been given is determined to have been given by the determination unit,
wherein the determining includes determining, by the determination unit, whether the end information has been output by determining whether an end notification file has been acquired, and
wherein the determining includes determining, by the determination unit, whether the end information has been output by determining whether an end notification file has been acquired.

6. The non-transitory computer-readable recording medium according to claim 5, wherein the determination unit comprises at least one of a local port monitor, a dispatcher, a computerizing driver, and a print processor.

7. The non-transitory computer-readable recording medium according to claim 5, wherein the combining unit comprises at least one of a local port monitor, a dispatcher, a computerizing driver, and a print processor.

8. The non-transitory computer-readable recording medium according to claim 5, wherein the combining includes combining, by the combining unit, the plurality of output information items by a RAW format or an EMF format.

9. An output control method executed by an output control device, the output control method comprising:
giving an instruction for outputting a single output target information item, to an application requesting output of the single output target information item as a plurality of output information items having the same identification information based on an output instruction, and subsequently giving an instruction to output end information indicating an end of outputting of the single output target information item;
storing the plurality of output information items output from the application in a predetermined save area upon changing the identification information of the plurality of output information items into identification information items that are different from each other;
determining whether the instruction to output the end information has been given; and
combining the plurality of output information items stored in the predetermined save area, when the instruction to output the end information indicating an end of outputting of the single output target information item is determined to have been given,
wherein the determining includes determining, by the determination unit, whether the end information has been output by determining whether an end notification file has been acquired, and
wherein the determining includes determining, by the determination unit, whether the end information has been output by determining whether an end notification file has been acquired.

10. The output control device according to claim 1, wherein said application requests the output of the single output target information item to be divided into the plurality of output information items.

* * * * *